Aug. 11, 1964   C. W. JOHNSON   3,143,839
MILO TOPPING MACHINE
Filed Sept. 18, 1961   4 Sheets-Sheet 1

INVENTOR.
CARL W. JOHNSON
BY
Fishburn and Gold
ATTORNEYS

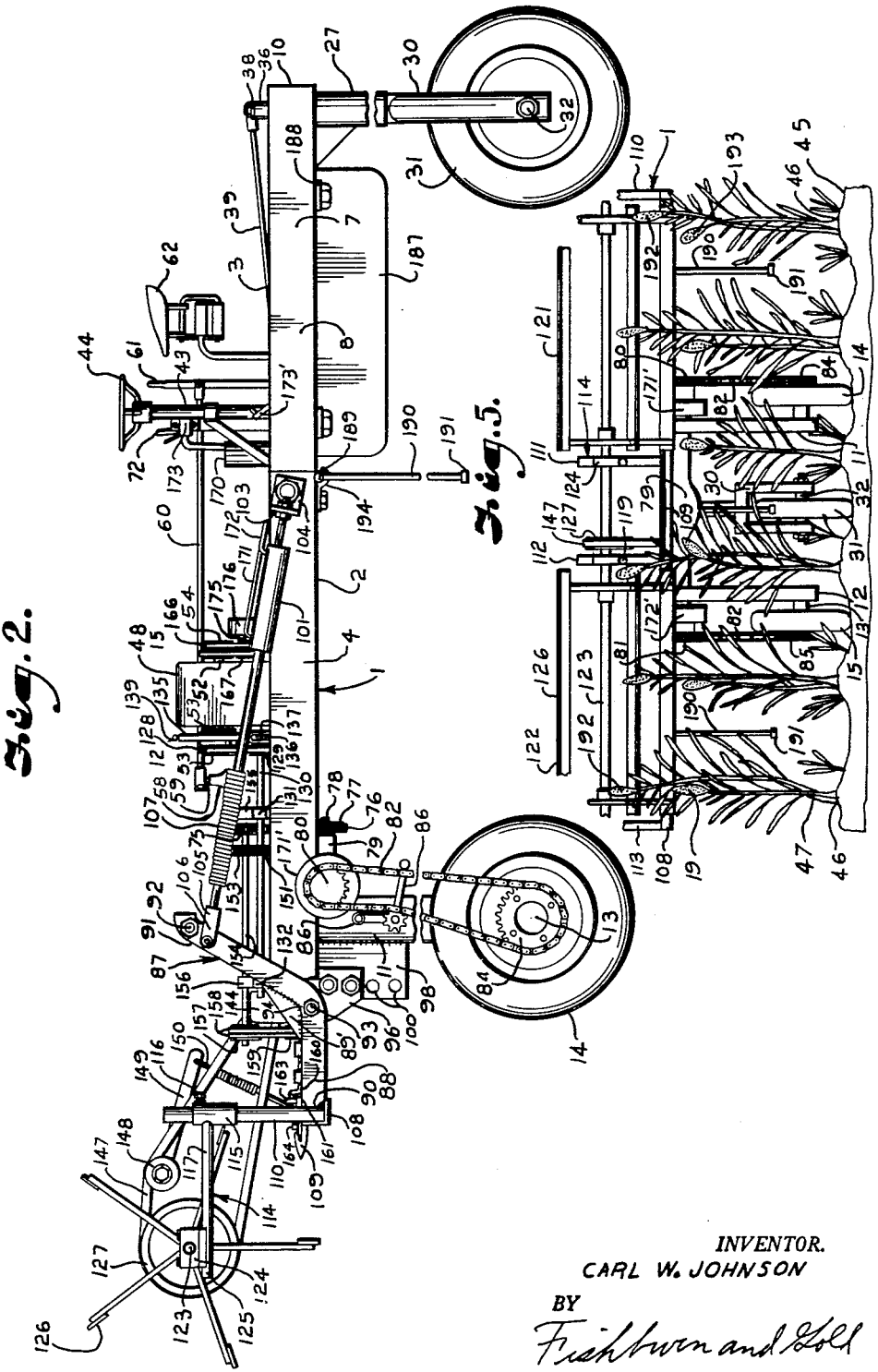

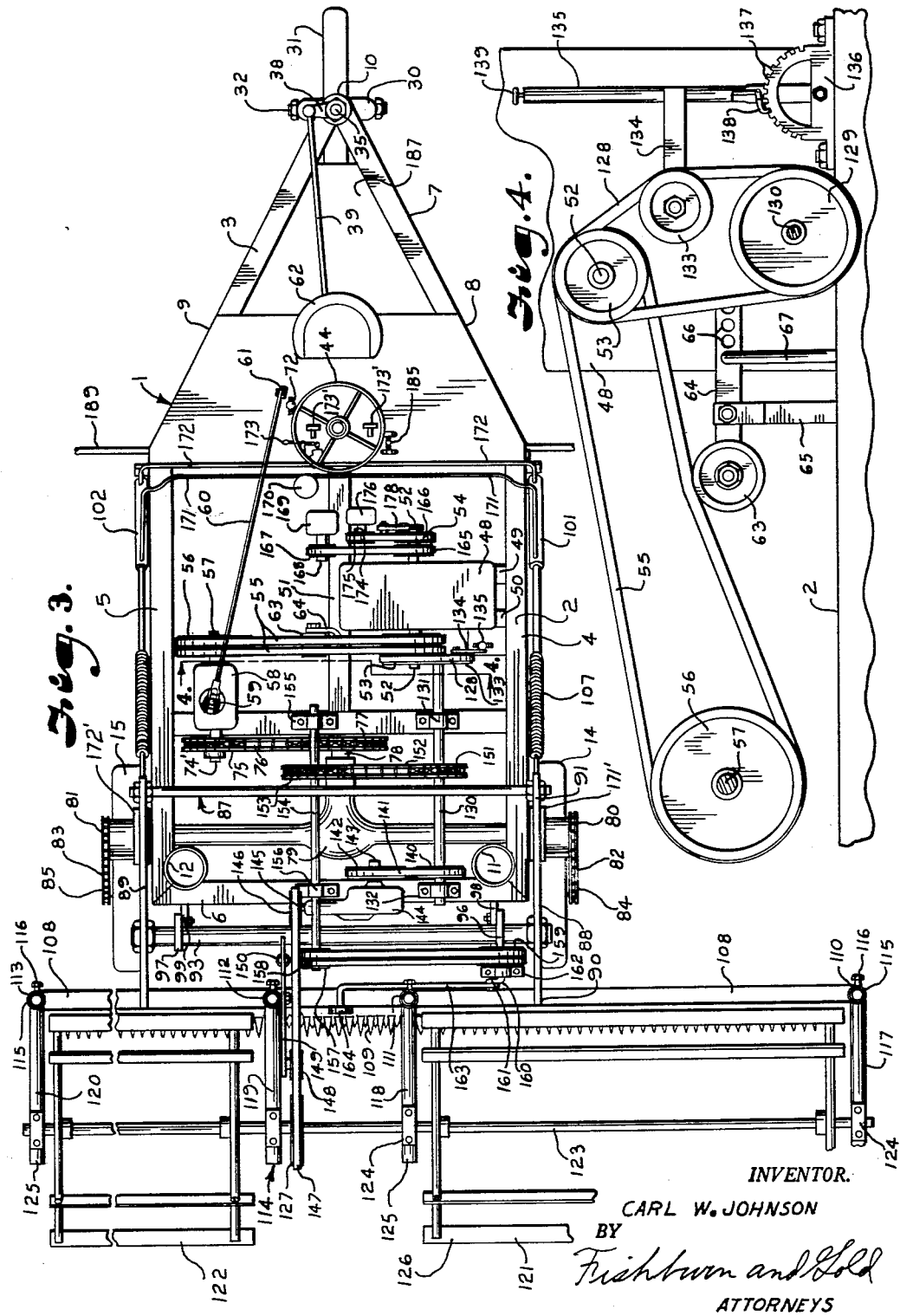

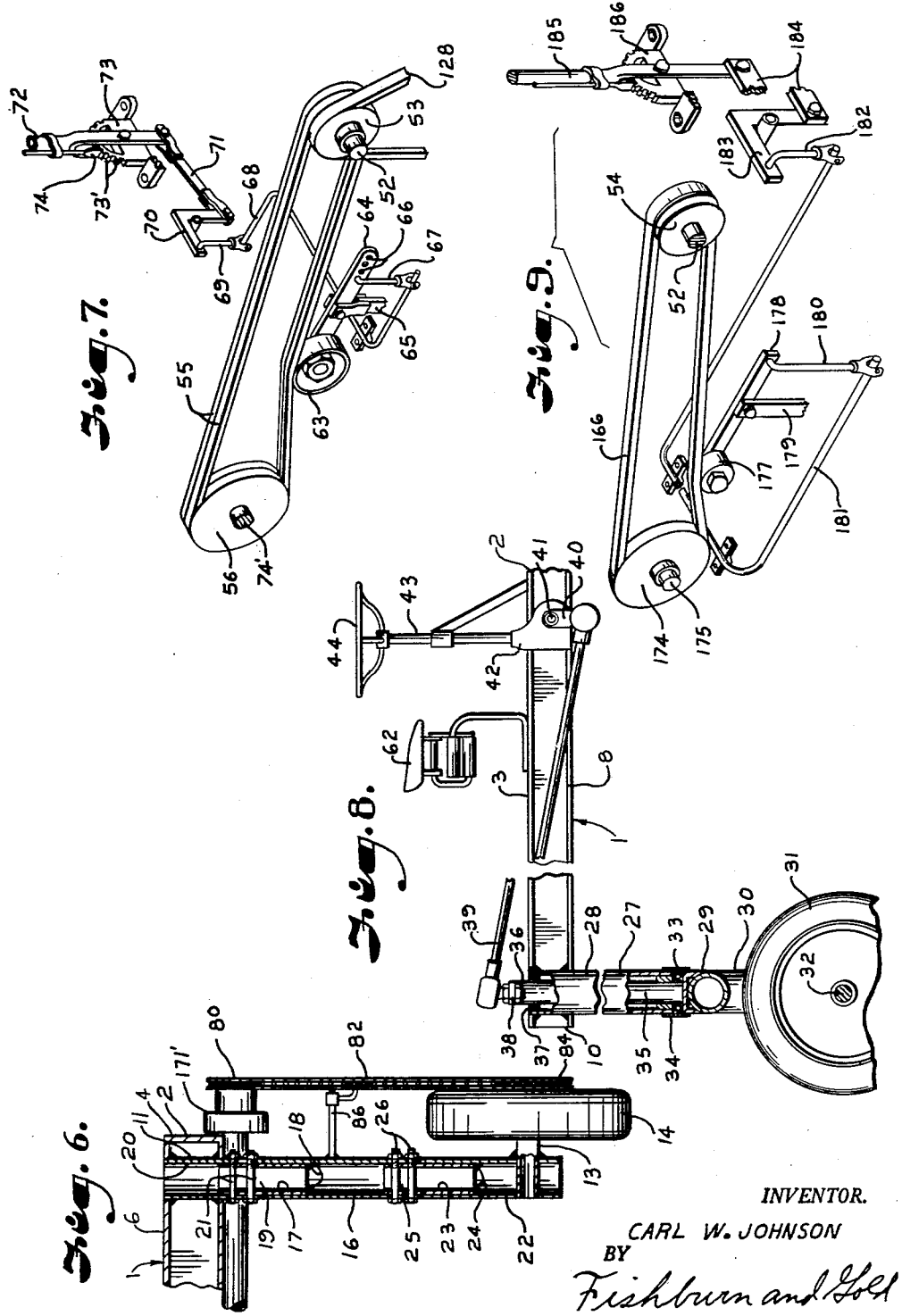

United States Patent Office 3,143,839
Patented Aug. 11, 1964

3,143,839
MILO TOPPING MACHINE
Carl W. Johnson, 517 N. Court, Ulysses, Kans.
Filed Sept. 18, 1961, Ser. No. 138,785
4 Claims. (Cl. 56—23)

This invention relates to agricultural equipment, and more particularly to a machine for topping milo.

In raising a hybrid milo crop, non-hybrid or so-called bastard milo plants often grow therewith, producing a source of contamination for the crop. If the non-hybrid plant heads are allowed to mature, the hybrid plant heads are likely to be pollenized thereby and, if this occurs in sufficient quantity, the hybrid milo seed will be unfit for certification, destroying the value of the crop.

It is a characteristic of non-hybrid milo that the plants thereof grow faster and attain an advantage in height over hybrid milo plants prior to maturity. This exposes the non-hybrid heads for selective removal by severing before pollenization can occur. The proper time for severing the non-hybrid milo heads generally occurs when the hybrid heads are approximately 40 inches in height. A second cutting of the non-hybrid heads is often desirable when the hybrid heads are approximately 50 inches in height.

An additional consideration in the production of hybrid milo is the necessity for maintaining the soil around the plants substantially weed-free so as not to interfere with the growth thereof. The most efficient method of weeding milo crops in recent years has been the use of specially compounded liquid sprays, such as solutions of "2–4–D," well known to the industry. However, care must be taken so that such weed-killing solutions do not come in contact with milo heads or the growth thereof may be severely retarded and, in severe cases, the plant may be killed.

It is the principal objects of the present invention to provide a milo topping or head severing machine adapted to travel through fields of milo 50 inches or more in height without damaging the desirable portion of the crop; to provide a self-propelled agricultural device which is adjustable to selectively cut non-hybrid milo heads from the plants thereof without harming the desirable hybrid heads; to provide such a machine which is adapted to spray weed-killing solutions on weeds near the base of the milo plants with little danger of contaminating the milo heads; to provide such an apparatus wherein the sickle bar height may be adjusted while the apparatus is in motion and the feed reel is adjustable with respect to the sickle bar; to provide such an agricultural machine which is adapted for crop topping and weed spraying simultaneously; and to provide such a device which is simple in construction, light in weight, easily maneuverable, efficient in operation and reliable in use.

Other objects and advantages of this invention will become apparent from the following description taken in connection with the accompanying drawings wherein are set forth by way of illustration and example certain embodiments of this invention.

FIG. 2 is a side elevation of the milo topping machine showing the forwardly extending feed reel and sickle bar.

FIG. 3 is a top view of the milo topping machine, particularly illustrating the driving trains thereon.

FIG. 4 is a fragmentary view on an enlarged scale taken on the line 4—4, FIG. 3, particularly illustrating the clutch controls for the cutters and wheel drive.

FIG. 5 is a front elevation of the machine shown progressing through a milo crop.

FIG. 6 is a fragmentary sectional view through the machine illustrating the construction of the front wheel supporting columns.

FIG. 7 is a fragmentary perspective view on an enlarged scale illustrating further details of the clutch control for the front wheel drive.

FIG. 8 is a fragmentary view in side elevation illustrating the construction of the rear wheel support and steering device.

FIG. 9 is a fragmentary perspective view illustrating the clutch control for the spray pump.

Figure 1:
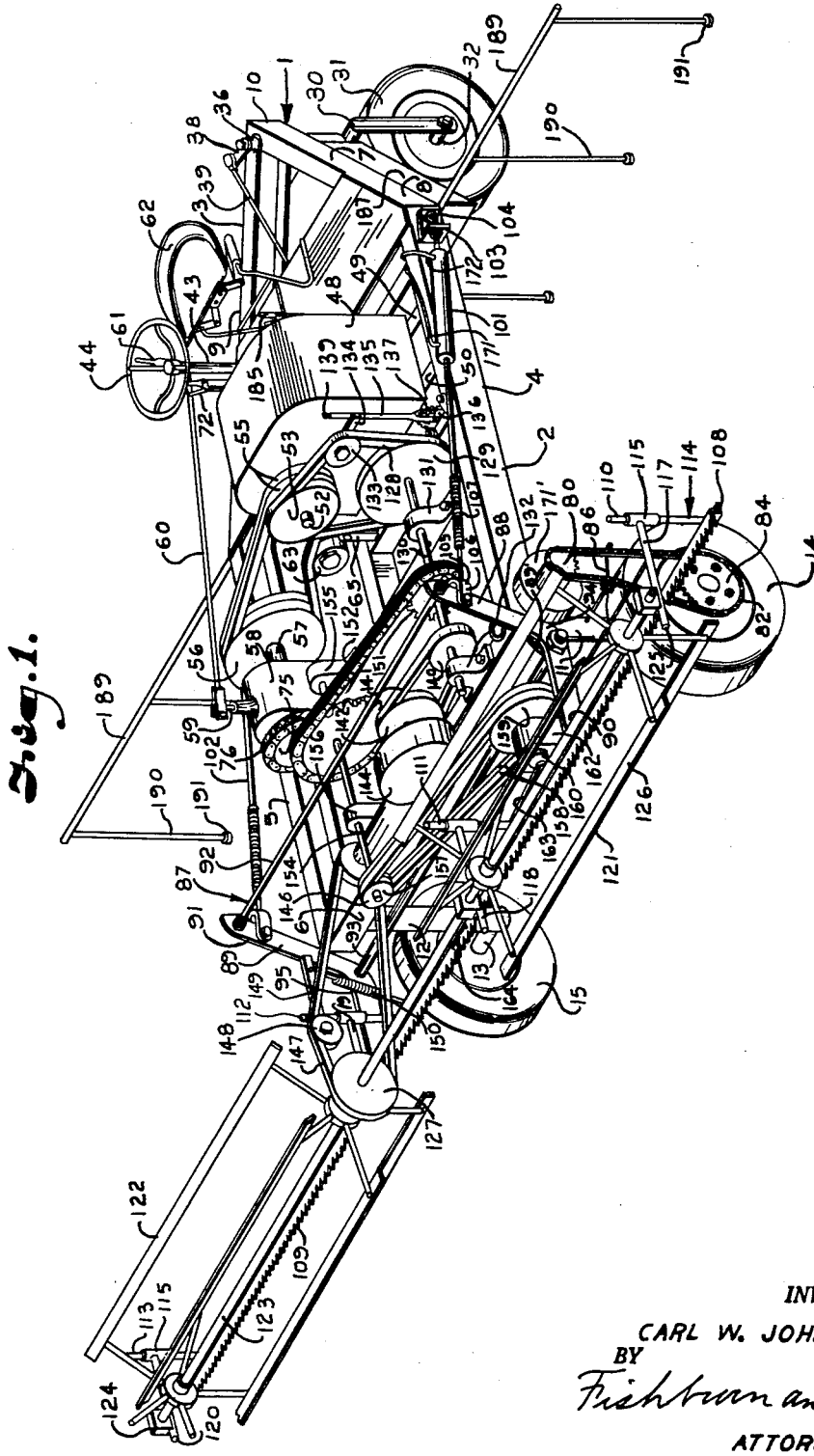
FIG. 1 is a perspective view of the milo topping machine particularly illustrating the positions of the major parts thereof.

Referring to the drawings in more detail:

The reference numeral 1 generally indicates the milo topping machine comprising this invention. The machine 1 includes an elongated normally horizontally extending platform structure 2 in the illusrtated structure formed from welded or otherwise connected lengths of lightweight, high strength channels 3. The channels 3 are arranged in relation to each other to form parallel spaced platform structure sides 4 and 5, a platform structure front 6 extending between and at an angle of 90 degrees to the sides 4 and 5 and a rear portion 7 formed by rearward extensions 8 and 9 respectively of the sides 4 and 5 and tapering toward each other and mating in a pointed rear terminus 10.

A pair of laterally spaced elongated supporting members or columns 11 and 12, preferably fabricated from high strength, thin walled steel tubing or the like, are preferably welded at the upper ends thereof adjacent the respective junctions of the sides 4 and 5 and front 6, FIG. 3. The front columns 11 and 12 extend downwardly from the platform structure 2 and each supports at the lower end thereof a laterally outwardly extending stud or axle 13 secured thereto in the illustrated structure by welding. The axles 13 respectively rotatably support front wheels 14 and 15 slightly spaced laterally of the front columns 11 and 12.

The front columns 11 and 12 each include as a portion thereof a center tubular section 16. Short lengths of tubing 17, which are of slightly smaller outside diameter than the inside diameter of the sections 16, are telescoped thereinto and fixed by welding at 18. The upper portions 19 of the lengths of the tubing 17 extend outwardly of the center tubular sections 16 and are adapted to telescope into the lower ends of fixed portions 20 of the front columns. Suitable bolts 21 extend through the upper portions 19 and the fixed portions 20 to secure the center tubular sections 16 in fixed relation to the platform structure 2. The lower or wheel supporting sections 22 of the respective front columns 11 and 12 has telescoped thereinto short lengths of tubing 23 which are welded thereto at 24 and have upper portions 25 extending outwardly thereof. The upper portions 25 are adapted to telescope into the lower ends of the center tubular sections 16 and suitable bolts 26 extend transversely through both the tubing 23 and the lower part of the center tubular sections 16 to form rigid connections therebetween. If it is desired to shorten the length of the front columns 11 and 12, the removal of the bolts 21 and 26 permits the center sections 16 to be disengaged therefrom whereby the upper portions 25 of the tubing 23 will telescope into the fixed portions 20. The bolts 26 may then be extended through the upper portions 25 and fixed portions 20 to produce rigid but shortened front columns.

A vertically extending supporting member or rear column 27 is comprised of an upper section 28 and a lower section 29. The upper section 28 is preferably formed of high strength, lightweight steel tubing secured at the upper end thereof adjacent the rear terminus 10 of the platform structure 2 preferably by welding. The lower section 29 of the rear column 27 is forked or bifurcated forming a pair of spaced downwardly extending legs 30, between which a rear wheel 31 is rotatably mounted on a suitable axle 32. A thrust load supporting ball bearing 33 is located between the upper section 28 and lower section 29 of the rear column 27 whereby the lower section is rotatable about a vertical axis extending longitudinally of the rear column 27. A suitable sleeve 34 surrounds the ball bearing 33 to keep debris and foreign matter from interfering with the operation thereof.

A vertically extending rod or post 35 is secured to the lower section 29, for example, by welding, and extends upwardly concentrically within the upper section 28 and terminates at the upper end thereof in a vertical stud 36. The ballbearing 33 surrounds the post 35 adjacent the lower ends thereof and a radial load ball bearing 37 surrounds the post 35 adjacent the upper end thereof to maintain the concentric relation with the section 28 and yet permit a relative rotation therebetween. A twisting force or torque applied by the vertical stud 36 to the post 35 causes a turning or steering of the rear wheel 31.

A link 38 is fixed at one end thereof to the stud 36 and is pivotally connected at the other end thereof to a steering rod 39. The steering rod 39 is pivotally connected to a link 40 secured to the output shaft 41 of a steering gear reducer 42, the input of which is a vertical steering column 43 extending upwardly from the platform structure 2 and terminating in a suitable steering wheel 44. It is apparent that the selective rotation of the steering wheel 44 will result in said steering of the rear wheel 31 to guide the machine 1 as it is propelled in a manner described hereinafter.

The front columns 11 and 12 and rear column 27, together with their respective wheels 14, 15 and 31, support the platform structure 2 above the ground at least equal to a nearly mature milo crop, about 50 inches. The front columns 11 and 12, with their respective wheels 14 and 15, are laterally spaced with respect to the rear column 27 and the rear wheel 31 whereby the machine 1 is adapted to travel through a milo field 45 with said wheels and columns respectively positioned between separate rows 46 of milo plants 47 so as not to interfere therewith.

A prime mover such as an internal combustion engine 48 is supported by the platform structure 2 on transversely extending frame beams 49 and 50 and a longitudinally extending frame beam 51. A power output shaft 52 extends both forwardly and rearwardly of the engine 48 and has a triple sheave pulley 53 secured at the forward section thereof. A double sheave pulley 54 is secured to the rear section of the power output shaft 52.

A pair of drive belts 55 are engaged with the pulley 53 and are also engaged with a double sheave pulley 56 secured to the input shaft 57 of a suitable transmission 58 preferably of the well known type having three input-output speed ratios and one reverse speed. The desired speed ratio of the transmission 58 is selected by positioning a stub shaft or stud 59 extending upwardly therefrom with a control rod 60 pivotally connected thereto and also to a lever 61. The lever 61 is located within convenient reach of an operator sitting in a suitable seat 62 secured to the platform structure 2 properly spaced from the steering wheel 44.

The drive belts 55 are loosely tensioned between the pulleys 53 and 56 whereby slippage is permitted therebetween unless an idler pulley 63 is urged against the drive belts 55 to take up the slack. The idler pulley 63 is rotatably mounted on one end of an arm 64 which is pivotally supported near the mid-portion thereof by a stationary post 65 secured to the platform structure 2. The arm 64 has a longitudinally extending row of receiving holes 66 at the other end thereof adapted to selectively receive one end of a control rod 67 to form a pivotal connection therewith. The other end of the control rod 67 is pivotally connected to a torque transmitting arm 68 which is pivotally connected by means of links 69, 70 and 71 to a control lever 72 within convenient reach of the operator's seat 62. The control lever 72 is pivotally mounted at the radial center of a half-gear anchoring member 73 having circumferentially spaced teeth 73'. The lever 72 has a suitable stop member or tongue 74 slidably retained thereagainst and adapted to engage in the teeth 73' in order to maintain the control lever 72 in a desired position. It is apparent that the pivotal displacement of the control lever 72 results in a pivotal displacement of the idler pulley 63 about the post 65 to selectively increase or decrease the tension on the belts 55 and to act as a clutch control between the pulleys 53 and 56.

The output shaft 74' of the transmission 58 has a sprocket 75 fixed thereto and engaging a drive chain 76 engaged with a sprocket 77. The sprocket 77 is fixed to a shaft 78 extending into a suitable differential 79 operatively connected to chain sprockets 80 and 81 respectively located adjacent the sides 4 and 5 near the platform structure front 6. Power transmitting chains 82 and 83 are respectively engaged with the chain sprockets 80 and 81 and with chain sprockets 84 and 85 which are fixed to the respective front wheels 14 and 15. Suitable chain tighteners 86 maintain the desired tension on the chains 82 and 83 for efficient power transmission. It is to be appreciated that the rotation of the transmission output shaft 74', through the above-described power transmission members, causes the front wheels 14 and 15 to rotate, propelling the machine 1 over the ground.

A first frame generally indicated by the reference number 87 has a pair of laterally spaced longitudinally extending substantially L-shaped members 88 and 89 respectively located on opposite sides 4 and 5 of the platform structure 2. The L-shaped members 88 and 89 are reinforced by plate members 89' and each has an end portion 90 extending forwardly of the platform structure 2 on an end portion 91 extending upwardly of the platform structure 2. The first frame 87 includes a stabilizing rod 92 secured to and extending between the end portions 91 of the L-shaped members 88 and 89. The first frame 87 is supported adjacent the front 6 of the platform structure 2 by a shaft 93 for pivotal movement about a horizontal axis extending laterally of the machine 1 and extending through the bends 94 and 95 of the L-shaped members 88 and 89. The shaft 93 is pivotally supported adjacent the front 6 of the platform structure 2 by means of suitable brackets 96 and 97 bolted to longitudinally extending support members 98 and 99 through selected transversely extending bolt-receiving bores 100. The support members 98 and 99 are fixed to the front 6 of the platform structure 2 and the fixed portion 20 of the front columns 11 and 12, in the illustrated structure, by welding.

A pair of extensible hydraulic cylinders or rams 101 and 102 are respectively pivotally connected at the rear ends 103 thereof by means of brackets 104 to the sides 4 and 5 of the platform structure 2. The front ends 105 of the hydraulic rams 101 and 102 are pivotally connected by means of clevises 106 to the upwardly extending end portions 91 of the L-shaped members 88 and 89. Intermediate the ends of the hydraulic rams 101 and 102, an extensible helical coil spring 107 provides shock absorption to prevent excessive stresses on the first frame 87 during heavy service. It is to be understood that the extension and contraction of the hydraulic rams 101 and 102 cause the first frame 87 to pivot whereby the forwardly extending end portions 90 are displaced or altered in distance with respect to the ground.

An elongated laterally extending sickle bar cutter support beam 108 is fixed to and between the forwardly extending end portions 90 of the L-shaped members 88 and 89 and projects laterally therefrom a substantial distance as indicated in FIG. 3. Forwardly extending mating cutting blades 109 are operatively supported by the support beam 108 and are driven reciprocally with respect to each other by means described hereinafter. A plurality of upwardly extending posts 110, 111, 112 and 113 are secured, in the illustrated structure, by welding at the lower ends thereof to the support beam 108 in laterally spaced relation. A second frame generally indicated 114 includes sleeves 115 adapted to telescope over the respective posts 110, 111, 112 and 113 and lock into positions longitudinally with respect thereto by means of suitable adjusting bolts 116. The second frame 114 includes a plurality of arms 117, 118, 119 and 120 secured to and supported by the sleeves 115 and projecting forwardly of the cutting blades 109.

A pair of coaxially positioned reels 121 and 122 are respectively fixed to a common shaft 123 rotatably mounted in pillow block bearings 124 located adjacent the free ends 125 on the forwardly projecting arms 117, 118, 119 and 120. The reel 121 is located between the forwardly projecting arms 117 and 118 and the reel 122 is located between the forwardly projecting arms 119 and 120. The reels 121 and 122 respectively include a plurality of circumferentially spaced laterally extending reel bats or boards 126 adapted to contact the milo for a purpose described hereinafter.

A pulley 127 is fixed to the shaft 123 intermediate the reels 121 and 122 by which the reels are rotatably driven by means now described. The pulley 53 on the engine output shaft 52 has an additional drive belt 128 engaged therewith which engages a pulley 129 fixed to a longitudinally extending shaft 130 rotatably mounted in pillow blocks 131 and 132 secured to the platform structure 2. The drive belt 128 is normally of excessive length to be in driving engagement with both the pulleys 53 and 129, an idler pulley 133 being required to remove the slack from the drive belt 128 when a driving engagement with the pulley 129 is desired. The idler pulley 133 is rotatably supported in alignment with the drive belt 128 on an arm 134 fixed to a rod or lever 135 pivotally connected at one end thereof to a semi-circular or half gear anchoring member 136 secured to the frame 2. The anchoring member 136 includes a plurality of circumferentially spaced teeth 137 adapted to be engaged by a pawl or tongue 138 pivotally connected to the rod or lever 135 and disengageable from the teeth 137 by means of a control button 139. By pressing the control button 139 and adjusting the pivotal position of the rod or lever 135 with respect to the anchoring member 136, a driving or non-driving relation may be maintained between the pulleys 53 and 129 as desired, FIG. 4.

A pulley 140 is fixed to the shaft 130 spaced from the pulley 129 and has engaged therewith a drive belt 141 engaging a pulley 142. The pulley 142 is fixed to a stub shaft 143 forming the input of a rear reducer 144 having an output shaft 145. A pulley 146 is fixed to the shaft 145 and carries a drive belt 147 engaged therewith and also engaged with the pulley 127 on the reel shaft 123. An idler pulley 148 is rotatably mounted on an arm 149 pivotally connected to the post 112 and having a tension spring 150 connected to the end opposite the pulley 148. The tension spring 150 is suitably anchored to the first frame 87 whereby the pulley 148 is continuously urged in a direction causing a tightening of the drive belt 147 regardless of the position of the arms 117, 118, 119 and 120 with respect to the posts 110, 111, 112 and 113. It is apparent that the drive members just described provide an operative connection between the internal combustion engine 48 and the reels 121 and 122 for rotating the latter as desired for moving milo into engagement with the cutting blades 109.

A sprocket 151 is fixed to the shaft 130 intermediate the pulleys 129 and 140 and carries a drive chain 152. The drive chain 152 engages with a sprocket 153 fixed to a shaft 154 rotatably mounted in pillow blocks 155 and 156 suitably anchored to the platform structure 2. Also fixed to the shaft 154 is a pulley 157 engaged with a pair of drive belts 158. The drive belts 158 contact and drive a pulley 159 fixed to a shaft 160 terminating in an offset or eccentric crank 161. The shaft 160 is rotatably mounted in a suitable pillow block 126 fixed to the platform structure 2. A rod 163 is pivotally connected at one end thereof to the eccentric crank 161 and at the other end thereof to a receiver 164 forming the driving connection for the movable teeth of the cutting blades 109. The rotation of the shaft 130 produces a lateral reciprocation of the rod 163 which results in the scissor-like cutting action of the cutting blades 109.

The double sheave pulley 54 fixed to the shaft 52 of the internal combustion engines 48 has a pair of drive belts 165 and 166 engaged therewith. The drive belt 165 contacts and drives a pulley 167 fixed to a shaft 168 forming the power input to a suitable hydraulic pump 169. The pump 169 is operatively connected to a hydraulic fluid reservoir 170 and to hydraulic fluid lines 171 and 172 for directing hydraulic fluid to the hydraulic rams 101 and 102. Suitable hydraulic controls 173 are provided adjacent the steering column 43 to raise and lower the first frame 87 by the rams 101 and 102 as desired.

Braking apparatus (not shown) of any suitable conventional type such as hydraulically controlled brakes are contained within brake drums 171' and 172' which rotate with the chain sprockets 80 and 81. The brake drums 171' and 172' are separately controlled with brake pedals 173' to aid the machine in making tight turns.

The drive belt 166 is engaged with a pulley 174 fixed to a shaft 174 forming the power input of a pump 176 used for a purpose described hereinafter. The drive belt 166 is loosely engaged with the pulleys 54 and 174 whereby driving engagement is not maintained without a belt tightening device. Such a belt tightening device is provided and includes an idler pulley 177 rotatably mounted on one end of an arm 178 which is pivotally supported intermediate the ends thereof on a post 179 suitably fixed to the platform structure 2. The other end of the arm 178 is pivotally connected to one end of a rod 180 which is in turn operatively connected by means of control links 181, 182, 183 and 184 to a control rod or lever 185. The control rod or lever 185 is pivoted to and engageable with a half gear or semi-circular anchoring member 186 in the manner described above in connection with the control rods or levers 135 and 172. The control rod or lever 185 is located adjacent the steering column 43 whereby the operator of the machine 1 can cause the pump 176 to be driven or disengaged as desired.

A tank 187 is adapted to contain a substantial quantity of a weed-killing solution, for example a solution of the type well known as "2-4-D." The tank 187 is removably secured to the platform structure 2 in a depending position from the rear portion 7 thereof by suitable brackets 188. The tank 187 is operatively connected to the pump 176 whereby said pump is adapted to withdraw the contents therefrom and discharge same under pressure. The output of the pump 176 communicates with a pipe boom 189 which extends horizontally and laterally outwardly of the platform structure 2 and has depending branch pipes 190 spaced laterally therealong a distance approximately equal to the normal distance between rows of milo plants. The branch pipes 190 terminate in nozzles 191 adapted to spray the weed-killing solution contained in the tank 187 generally downwardly but diffused over the ground in a wide area. The nozzles 191 are located and aimed with respect to the ground so that the weed-killing solution will not come in contact with the heads 192 of the non-hybrid milo plants or the heads 193 of the shorter hybrid milo plants. It is noted that removable brackets 194 are provided on the underside of the platform structure 2 for obtaining the complete removal of the pipe boom when it is not needed.

The milo topping machine 1 is preferably used as follows: When the hybrid milo heads are approximately 40 inches in height, the non-hybrid heads are somewhat higher. The cutting teeth 109 are thus set at approximately 40 inches above the ground by means of the hydraulic rams 101 and 102 after selecting lower bores 100 for supporting the first frame 87. The reels 121 and 122 are adjusted in height by changing the position of the sleeves 115 longitudinally with respect to the posts 110, 111, 112 and 113 so that the boards or bats 126 strike the bastard heads at the most desired angle for feeding same into the cutting teeth. This latter adjustment is independent of the adjustment of the teeth 109 with respect to the ground and the relationship between the reels 121 and 122 and the cutting teeth 109 once set will remain the same regardless of a change in the height of the teeth 109. The machine 1 is then driven through the fields in a direction parallel to the rows of milo plants, and the non-hybrid heads are cut from their respective plants. Simultaneously a weed-killing solution may be applied to the ground area around the lower portions of the milo plants to kill weeds with little danger of the solution contacting the milo heads. By the time the hybrid heads are approximately 50 inches in height, the heavy shading near the ground resulting from the milo leaves will usually prevent a significant recurrence of weeds and for the next pass of the machine 1 the pipe boom 189 and tank 187 may be removed from the machine. The cutting blades 109 are then adjusted to approximately 50 inches above the ground so as to pass over the hybrid heads while severing the taller non-hybrid heads which were not removed earlier in the season.

The milo topping machine 1 is preferably approximately 9 feet long and the front wheels are approximately 5 feet apart. The reels and cutters are of an over-all dimension laterally of the machine whereby the machine will cut approximately a 14-foot swath through the milo field. It is to be appreciated that the milo topping machine is of simple and inexpensive construction and light in weight for ease of maneuverability.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. A machine for use in the growing of hybrid milo in spaced rows wherein non-hybrid milo grows, by cutting off non-hybrid milo heads above the level of hybrid milo heads comprising, an elongated generally horizontally extending platform structure having a front, a pair of laterally spaced elongated front columns and an elongated rear column secured to and extending downwardly from said platform structure, a wheel rotatably mounted on the lower ends of each of said columns, said columns and wheels having lateral spacing relative to the direction of travel for positioning between rows of milo and supporting said platform structure above the ground a height at least equal to a nearly mature crop of milo, a steering wheel mechanism extending upwardly from said platform structure, means operatively connecting said steering wheel mechanism with the rear column wheel for steering said platform structure with the wheels between the rows, an internal combustion engine supported by said platform structure, power transmission means operatively connecting said engine to at least one of the front column wheels for propelling said machine, a first frame having end portions forwardly of said platform structure front, pivot means for supporting said first frame on said platform structure front for pivotal movement about a horizontal axis extending laterally of said machine, means supporting said pivot means and secured relative to said platform structure at selected spaced positions for selected spaced relation of said first frame above the ground, an elongated laterally extending sickle bar cutter support beam fixed to said first frame forwardly extending end portions, forwardly extending cutting blades on said cutter support beam, extensible means carried by the platform and connected to said first frame for pivoting said first frame to position said sickle bar cutter at a level above the hybrid milo heads to cut off taller non-hybrid milo heads, a plurality of upwardly extending posts secured in laterally spaced relation to said cutter support beam, a second frame supported by said posts and longitudinally adjustable thereon, said second frame including a plurality of arms projecting forwardly of said cutting blades, a reel rotatably supported between said second frame arms for moving milo into engagement with said cutting blades, and means operatively connected to said engine for driving said cutting blades and rotating said reel.

2. A machine for use in the growing of hybrid milo in spaced rows where in non-hybrid milo grows, by cutting off non-hybrid milo heads above the level of hydrid milo heads comprising, an elongated generally horizontally extending platform structure having a front and sides, a pair of laterally spaced elongated front columns and an pair of laterally spaced elongated front columns and an elongated rear column secured to and extending downwardly from said platform structure, a wheel rotatably mounted on the lower ends of each of said columns, said columns and wheels having lateral spacing relative to the direction of travel for positioning between rows of milo and supporting said platform structure above the ground a height at least equal to a nearly mature crop of milo, a steering wheel mechanism extending upwardly from said platform structure, means operatively connecting said steering wheel mechanism with the rear column wheel for steering said platform structure with the wheels between the rows, an internal combustion engine supported by said platform structure, power transmission means operatively connecting said engine to at least one of the front column wheels for propelling said machine, a first frame having a pair of laterally spaced longitudinally extending L-shaped members respectively located on the sides of said platform structure, said L-shaped member each having an end portion extending upwardly of said platform structure, said L-shaped members each having an end portion extending forwardly of said platform structure, means secured on the front of said platform structure at selected elevations for supporting said first frame for pivotal movement about a horizontal axis extending laterally of said machine and through the bend of said L-shaped members and at a selected spacing above the ground, an elongated laterally extending sickle bar cutter support beam fixed to said forwardly extending end portions of said L-shaped members and projecting laterally therefrom, forwardly extending cutting blades on said cutter support beam, a pair of extensible hydraulic rams each having one end pivotally connected respectively to the opposite sides of said platform structure and other ends pivotally connected to said upwardly extending end portions of said L-shaped members and operative to pivot said L-shaped members to adjust the height of the sickle bar cutter and position same at a level above the hybrid milo heads and below non-hybrid milo heads to cut off said non-hybrid milo heads, a plurality of upwardly extending posts secured in laterally spaced relation to said cutter support beam, a second frame supported by said posts and longitudinally adjustable thereon, said second frame including a plurality of arms projecting forwardly of said cutting blades, a reel rotatably supported between said second frame arms for moving milo into engagement with said cutting blades, and means operatively connected to said engine for driving said cutting blades and rotating said reel.

3. A machine for use in the growing of hybrid milo in spaced rows wherein non-hybrid milo and weeds grow, by cutting off heads of non-hybrid milo above the level of hybrid milo heads and spraying weed eradicants between such rows below the level of said hybrid heads comprising, a platform structure having a front, a plurality of supporting members secured to said platform structure and extending downwardly therefrom, wheels rotatably mounted on said supporting members, said supporting members and wheels having lateral spacing relative to the direction of travel for positioning between rows of milo and supporting said platform structure above the ground a height at least equal to a nearly mature milo crop, means operatively connected to at least one of said wheels for steering said platform structure over the ground between said rows, means connected to said platform structure and operative for propelling said machine, a frame, means secured to said platform structure at selected positions for supporting said frame on said platform structure at selected elevations above the ground, a portion of said frame extending forwardly of said platform structure front, cutter means supported on and operating adjacent said forwardly extending portion, means for moving said frame on said frame supporting means for adjusting at least said forwardly extending portion of said frame in height with respect to the ground to position said cutting means above hybrid milo heads and below non-hybrid milo heads for cutting off said non-hybrid milo heads, means connected to said platform structure and operative for driving said cutter means while said machine is being propelled, a pipe boom supported from said platform and extending transversely and horizontally beneath and projecting laterally from said platform structure, a plurality of spaced depending elongated tubes communicating with said pipe boom and each terminating at the lower end thereof in a downwardly directed spray nozzle positioned between said rows and substantially below the hybrid milo heads, and means for feeding weed eradicating fluid under pressure into said pipe boom whereby fluid is sprayed from said nozzles onto weeds to kill same.

4. A machine for use in the growing of hybrid milo in spaced rows wherein non-hybrid milo and weeds grow, by cutting off non-hybrid milo heads above the level of hybrid milo heads and spraying weed eradicants between such rows below the level of said hybrid heads comprising, an elongated generally horizontally extending platform structure having a front, a pair of laterally spaced elongated front columns and an elongated rear column secured to and extending downwardly from said platform structure, a wheel rotatably mounted on the lower ends of each of said columns, said columns and wheels having lateral spacing relative to the direction of travel for positioning between rows of milo and supporting said platform structure above the ground a height at least equal to a nearly mature crop of milo, a steering wheel mechanism extending upwardly from said platform structure, means operatively connecting said steering wheel mechanism with the rear column wheel for steering said platform structure with the wheels between the rows, an internal combustion engine supported by said platform structure, power transmission means operatively connecting said engine to at least one of the front column wheels for propelling said machine, a first frame having end portions forwardly of said platform structure front, means secured on said platform structure front at selected elevation for supporting said first frame for pivotal movement about a horizontal axis extending laterally of said machine and at a selected spacing above the ground, an elongated laterally extending sickle bar cutter support beam fixed to said first frame forwardly extending end portions, forwardly extending cutting blades on said cutter support beam, extensible means carried by the platform and connected to said first frame for pivoting said first frame to position said sickle bar cutter at a level above the hybrid milo heads to cut off taller non-hybrid milo heads, a plurality of upwardly extending posts secured in laterally spaced relation to said cutter support beam, a second frame supported by said posts and longitudinally adjustable thereon, said second frame including a plurality of arms projecting forwardly of said cutting blades, a reel rotatably supported between said second frame arms for moving milo into engagement with said cutting blades, means operatively connected to said engine for driving said cutting blades and rotating said reel, a fluid storage tank carried by said platform structure in depending relation thereto for containing fluid weed eradicants, a pipe boom supported from said platform structure and extending transversely and horizontally beneath same and projecting laterally thereof, a plurality of spaced depending elongated tubes communicating with said pipe boom and each terminating at the lower end thereof in a downwardly directed spray nozzle substantially below the level of the hybrid milo heads, a pump operatively connected to said tank and to said pipe boom, and means operatively connected between said pump and said engine for driving said pump whereby fluid weed eradicant is sprayed from said nozzle downwardly onto weeds to kill same.

References Cited in the file of this patent
UNITED STATES PATENTS

| | | |
|---|---|---|
| 2,510,245 | Munter | June 6, 1950 |
| 2,580,813 | Miller | Jan. 1, 1952 |
| 2,674,082 | Ryden | Apr. 6, 1954 |
| 2,696,703 | Kucera | Dec. 14, 1954 |